(12) United States Patent
Murakami et al.

(10) Patent No.: US 11,561,133 B2
(45) Date of Patent: Jan. 24, 2023

(54) SPECTROMETER MODULE

(71) Applicant: HAMAMATSU PHOTONICS K. K., Hamamatsu (JP)

(72) Inventors: Kazumasa Murakami, Hamamatsu (JP); Shinsuke Okada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/567,342

(22) Filed: Jan. 3, 2022

(65) Prior Publication Data

US 2022/0120613 A1 Apr. 21, 2022

Related U.S. Application Data

(63) Continuation of application No. 17/140,305, filed on Jan. 4, 2021, now Pat. No. 11,248,957.

(30) Foreign Application Priority Data

Jan. 7, 2020 (JP) .............................. JP2020-000938

(51) Int. Cl.
*G01J 3/28* (2006.01)
*G01J 3/02* (2006.01)
*G02B 7/00* (2021.01)

(52) U.S. Cl.
CPC ............... *G01J 3/28* (2013.01); *G01J 3/0202* (2013.01); *G02B 7/006* (2013.01)

(58) Field of Classification Search
CPC ........ G01J 3/28; G01J 3/02; G01J 3/51; G01J 3/0202; G01J 2003/1213; G01J 3/0259; G01J 3/2803; G01J 3/36; G01J 3/0262; G01B 11/00; G01N 21/25; G02B 7/006
See application file for complete search history.

(56) References Cited

U.S. PATENT DOCUMENTS

| 7,382,456 | B2 | 6/2008 | Tixier et al. |
| 8,633,440 | B2 | 1/2014 | Knapp |
| 11,248,957 | B2 * | 2/2022 | Murakami ........... G02B 27/141 |
| 2007/0195310 | A1 | 8/2007 | Kanda |
| 2019/0035839 | A1 | 1/2019 | Byun |

FOREIGN PATENT DOCUMENTS

| JP | 2013-532293 A | 8/2013 |
| WO | WO 2012/003395 A2 | 1/2012 |

* cited by examiner

*Primary Examiner* — Abdullahi Nur
(74) *Attorney, Agent, or Firm* — Faegre Drinker Biddle & Reath LLP (57) ABSTRACT

A spectroscopic module includes a plurality of beam splitters that are arranged along an X direction; a plurality of bandpass filters disposed on one side in a Z direction with respect to the plurality of beam splitters facing the plurality of beam splitters, respectively; a light detector disposed on the one side in the Z direction with respect to the plurality of bandpass filters and including a plurality of light receiving regions facing the plurality of bandpass filters, respectively; a first support body supporting the plurality of beam splitters; and a second support body supporting the plurality of bandpass filters. The second support body includes a support portion in which a support surface is formed so as to be open to the one side in the Z direction. The plurality of bandpass filters are disposed on the support surface.

5 Claims, 10 Drawing Sheets

SPECTROMETER MODULE

TECHNICAL FIELD

The present disclosure relates to a spectroscopic module.

BACKGROUND

As a spectroscopic module that splits measurement light into light in a plurality of wavelength bands to detect the light in each of the wavelength bands, Japanese Translation of PCT International Application Publication No. 2013-532293 describes a device in which a plurality of beam splitters and a plurality of bandpass filters are disposed in a casing.

SUMMARY

The device described in Japanese Translation of PCT International Application Publication No. 2013-532293 has a structure where in the casing, the plurality of bandpass filters are attached to a baffle assembly from a side on which the plurality of beam splitters are disposed. For this reason, during production of the device, for example, when damage or the like is found in a bandpass filter after the plurality of bandpass filters are attached to the baffle assembly and the plurality of beam splitters are disposed in the casing, the removal of the beam splitters from the casing for the replacement of the bandpass filter is required. Therefore, the device described in Japanese Translation of PCT International Application Publication No. 2013-532293 may cause a decrease in production efficiency, which is a problem.

An object of the present disclosure is to provide a spectroscopic module of which the production efficiency can be improved.

According to one aspect of the present disclosure, there is provided a spectroscopic module including: a plurality of beam splitters that are arranged along a first direction; a plurality of bandpass filters that are disposed on one side in a second direction intersecting the first direction with respect to the plurality of beam splitters, each of the plurality of bandpass filters facing each of the plurality of beam splitters; a light detector that is disposed on the one side in the second direction with respect to the plurality of bandpass filters and includes a plurality of light receiving regions, each of the plurality of light receiving regions facing each of the plurality of bandpass filters; and a support body that supports the plurality of beam splitters and the plurality of bandpass filters. The support body includes a support portion in which a support surface is formed so as to be open to the one side in the second direction. The plurality of bandpass filters are disposed on the support surface.

DETAILED DESCRIPTION

Hereinafter, an embodiment of the present disclosure will be described in detail with reference to the drawings. Incidentally, in the drawings, the same or equivalent portions are denoted by the same reference signs, and duplicated descriptions will be omitted.

Figure 1:
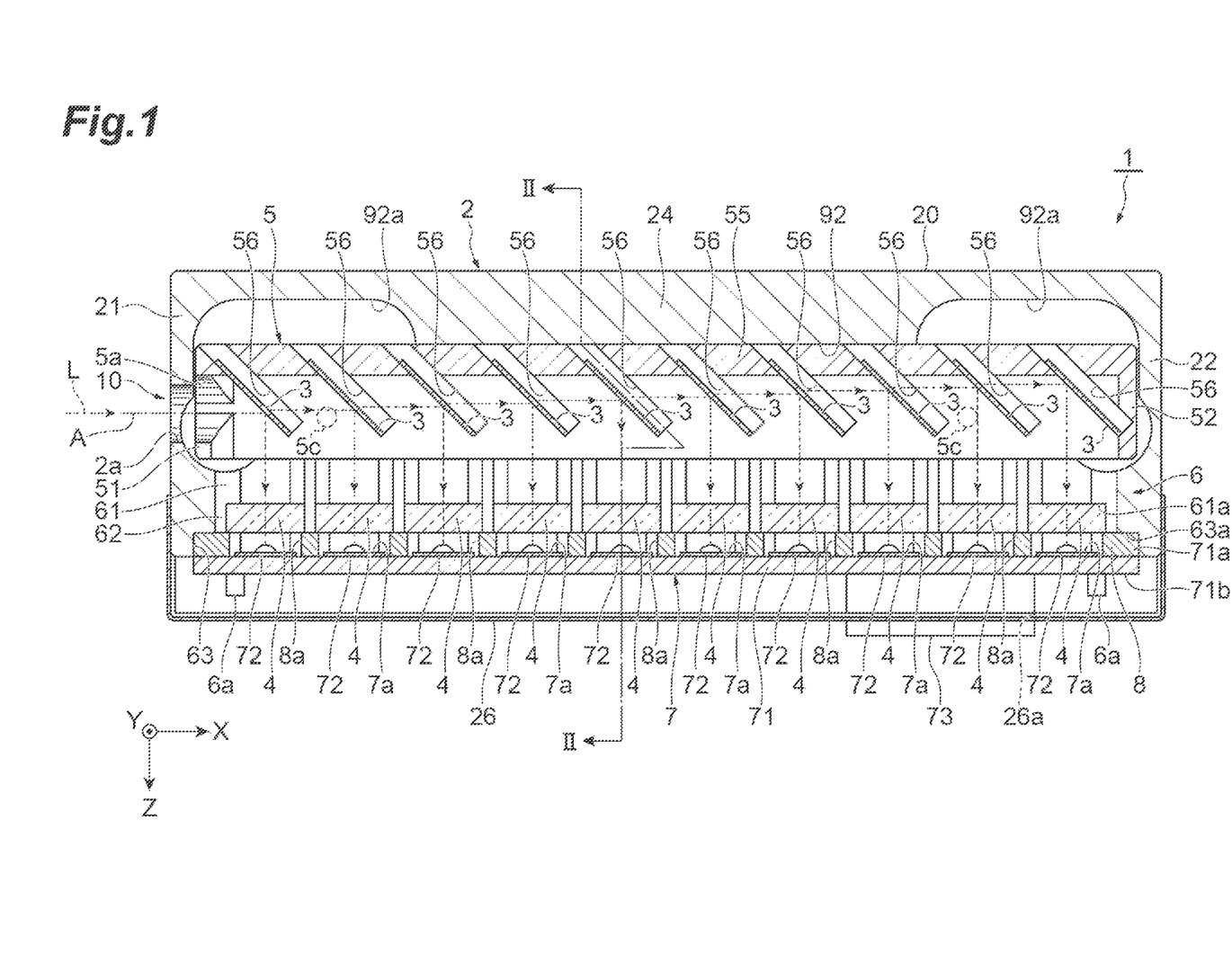
FIG. 1 is a cross-sectional view of a spectroscopic module of one embodiment.
Figure 2:
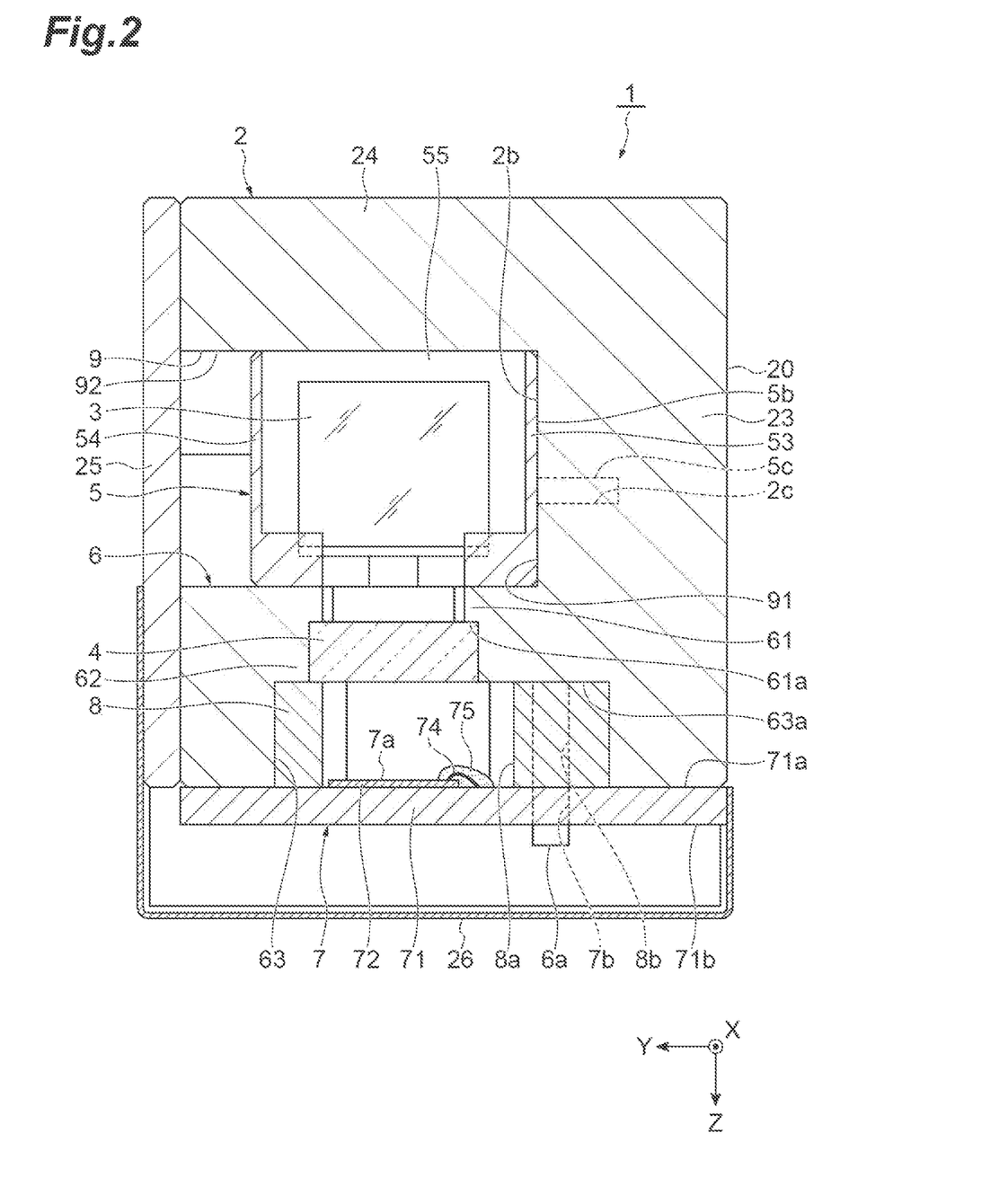
FIG. 2 is a cross-sectional view along line II-II illustrated in FIG. 1.

As illustrated in FIGS. 1 and 2, a spectroscopic module 1 is a spectrometer module which includes a casing 2, a plurality of beam splitters 3, a plurality of bandpass filters 4, a first support body (support body) 5, a second support body (support body) 6, a light detector 7, and a light shielding member 8. The plurality of beam splitters 3 are arranged along an X direction (first direction). The plurality of bandpass filters 4 are disposed on one side in a Z direction perpendicular to the X direction (second direction intersecting the first direction) with respect to the plurality of beam splitters 3. The light detector 7 is disposed on the one side in the Z direction with respect to the plurality of bandpass filters 4. The light detector 7 includes a plurality of light receiving regions 7a.

Each of the beam splitters 3 is, for example, a half mirror, and reflects a part of light, which is incident along the X direction, to the one side in the Z direction and transmits light, which is other than the part of the incident light, to one side in the X direction. Each of the bandpass filters 4 faces each of the beam splitters 3 in the Z direction, and transmit light in a predetermined wavelength band of the light, which is incident from the beam splitters 3 along the Z direction, to the one side in the Z direction. The bandpass filters 4 each transmit light in different wavelength bands. Each of the light receiving regions 7a faces each of the bandpass filters 4 in the Z direction, and detect the light incident from the bandpass filters 4 along the Z direction. The light receiving regions 7a form different light detection channels, respectively. In the spectroscopic module 1, measurement light L is split into light in a plurality of wavelength bands by the plurality of beam splitters 3 and the plurality of bandpass filters 4, and the light in each of the wavelength bands is detected by the light detector 7.

The beam splitters 3 are, for example, dichroic mirrors, and reflect light in a detection wavelength band at a reflectance of 90% or more to efficiently guide the light to the bandpass filters 4, respectively. Meanwhile, the dichroic mirrors also reflect light in a non-detection wavelength band at a reflectance of approximately 10% to guide the light to the bandpass filters 4, respectively. Here, if each of the bandpass filters 4 is not provided, since the ratio for detection of the light in the non-detection wavelength band in the light detector 7 is dependent on the reflectance of the dichroic mirror and is approximately 10%, the light shielding performance for the light in the non-detection wavelength band is not sufficiently exhibited, and selective wavelength detection is difficult. On the other hand, if each of the bandpass filters 4 is provided, since each of the bandpass filters 4 has a characteristic that the transmittance of the light in the non-detection wavelength band is 0.01% or less, the ratio for detection of the light in the non-detection wavelength band in the light detector 7 also is 0.01% or less. Therefore, in the spectroscopic module 1 including the bandpass filters 4, the light shielding performance for the light in the non-detection wavelength band is sufficiently exhibited, and selective wavelength detection is possible. Incidentally, the production of a beam splitter having a non-detection wavelength band of 0.01% or less is technically feasible, but is not realistic from the viewpoint of cost.

As illustrated in FIGS. 1 and 2, the casing 2 is a housing which accommodates the plurality of beam splitters 3, the plurality of bandpass filters 4, the first support body 5, the second support body 6, the light detector 7, and the light shielding member 8. The casing 2 includes a main body portion 20. The main body portion 20 is formed of a first wall portion 21, a second wall portion 22, a third wall portion 23, and a fourth wall portion 24. The first wall portion 21 and the second wall portion 22 face each other in the X direction. The second wall portion 22 is located on the one side in the X direction with respect to the first wall portion 21. The third wall portion 23 is located on one side in a Y direction perpendicular to both X direction and the Z direction with respect to the first wall portion 21 and the second wall portion 22. The fourth wall portion 24 is located on the other side (side opposite the one side) in the Z direction with respect to the first wall portion 21, the second wall portion 22, and the third wall portion 23.

A first light incident hole 2a through which the measurement light L is incident into the casing 2 along the X direction is formed in the first wall portion 21. An inner surface 2b parallel to both the X direction and the Z direction is formed in the third wall portion 23. Each of a plurality of positioning holes 2c formed in the third wall portion 23 is open to the inner surface 2b. The third wall portion 23 is integrally formed with the second support body 6. The main body portion 20 and the second support body 6 form a recessed portion 9 having the inner surface 2b of the third wall portion 23 as a bottom surface 91. Namely, the casing 2 defines the recessed portion 9 having the inner surface 2b of the third wall portion 23 as the bottom surface 91. The main body portion 20 and the second support body 6 are integrally formed from, for example, metal.

The casing 2 further includes a cover portion 25 and a shield cover 26. The cover portion 25 is attached to the main body portion 20 and the second support body 6 to close an opening of the recessed portion 9. The shield cover 26 is attached to the main body portion 20 and the cover portion 25 to cover the light detector 7 from the one side in the Z direction.

As illustrated in FIGS. 1 and 2, the first support body 5 supports the plurality of beam splitters 3. Each of the beam splitters 3 has a plate shape and has a thickness of 1 mm or less. Each of the beam splitters 3 has a long shape when seen in a thickness direction of each of the beam splitters 3, and a direction perpendicular to a longitudinal direction of each of the beam splitters 3 is a direction parallel to the Y direction. The beam splitters 3 each have the same shape. Each of the beam splitters 3 has, for example, a rectangular plate shape.

The first support body 5 is formed of a first wall portion 51, a second wall portion 52, a third wall portion 53, a fourth wall portion 54, and a fifth wall portion 55. The first wall portion 51 and the second wall portion 52 face each other in the X direction. The second wall portion 52 is located on the one side in the X direction with respect to the first wall portion 51. The third wall portion 53 and the fourth wall portion 54 face each other in the Y direction. The third wall portion 53 is located on the one side in the Y direction with respect to the first wall portion 51 and the second wall portion 52. The fourth wall portion 54 is located on the other side in the Y direction with respect to the first wall portion 51 and the second wall portion 52. The fifth wall portion 55 is located on the other side in the Z direction with respect to the first wall portion 51, the second wall portion 52, the third wall portion 53, and the fourth wall portion 54. The first support body 5 is integrally formed from, for example, metal.

A second light incident hole 5a through which the measurement light L is incident on the plurality of beam splitters 3 along the X direction is formed in the first wall portion 51. An outer surface 5b parallel to both the X direction and the Z direction is formed in the third wall portion 53. The outer surface 5b is provided with a plurality of positioning pins 5c. The first support body 5 is attached to the third wall portion 23 such that the outer surface 5b is in contact with the inner surface 2b of the casing 2 in a state where each of the positioning pins 5c is fitted into each of the positioning holes 2c of the casing 2, to define the position of the first support body 5 in a plane (along the plane) parallel to both the X direction and the Z direction.

The first support body 5 is disposed in the recessed portion 9 in a state where the outer surface 5b is in contact with the inner surface 2b of the casing 2 (namely, the bottom surface 91 of the recessed portion 9). A side surface 92 of the recessed portion 9 includes a plurality of separation regions 92a. Each of the separation regions 92a is separated from the first support body 5. In the present embodiment, the side surface 92 is formed of inner surfaces of the first wall portion 21, the second wall portion 22, and the fourth wall portion 24 of the main body portion 20 and a surface of the second support body 6, the surface being on the fourth wall portion 24 side. Incidentally, the side surface 92 may include at least one separation region 92a. In addition, the separation region 92a may be the entirety of the side surface 92.

A plurality of grooves 56 are formed in the first support body 5. Each of the beam splitters 3 is disposed in each of the grooves 56. Accordingly, the first support body 5 is provided with a plurality of combinations of the grooves 56 and the beam splitters 3. Hereinafter, each of the plurality of combinations is referred to as a "corresponding groove 56 and beam splitter 3".

Figure 3:
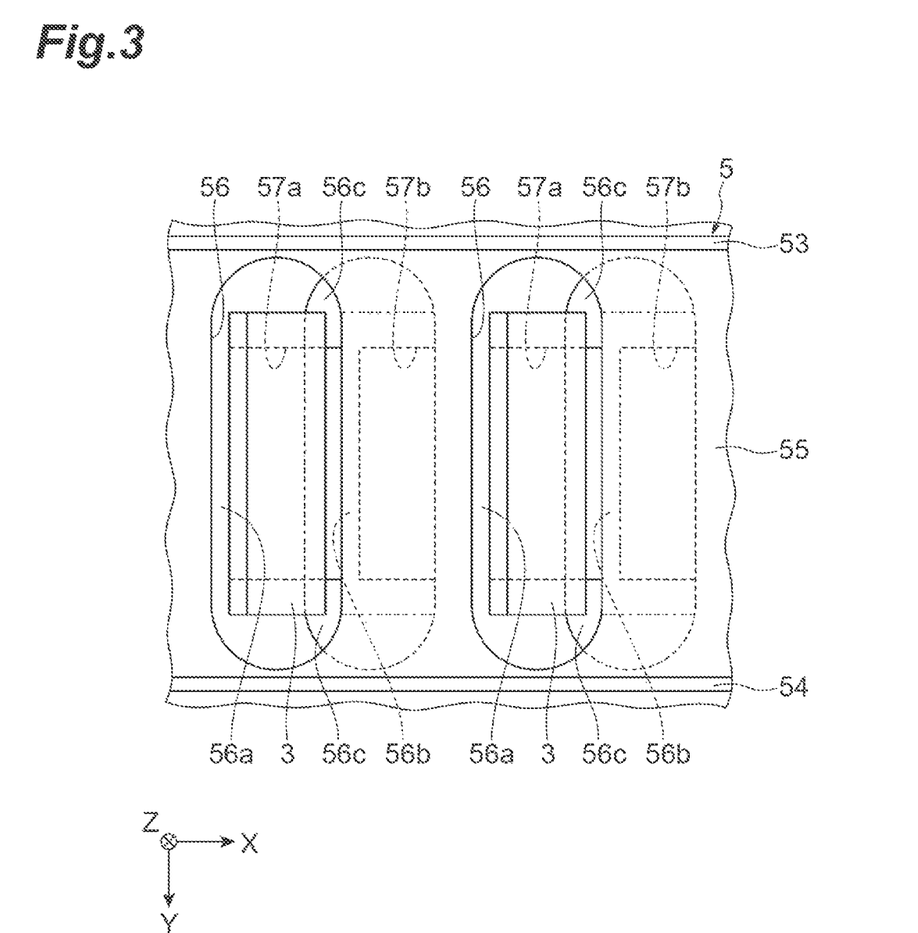
FIG. 3 is a plan view of a portion of a first support body illustrated in FIG. 1.

As illustrated in FIGS. 1 and 3, each of the grooves 56 is open to an outer surface of the fifth wall portion 55. An extending direction of each of the grooves 56 is a direction parallel to the Y direction. A depth direction of each of the grooves 56 is a direction which is inclined by 45° such that the deeper the groove 56 is, the closer to the one side in the X direction the groove 56 is located, among directions perpendicular to the Y direction. Each of the grooves 56 has a pair of side surfaces 56a and 56b and a bottom surface 56c. The pair of side surfaces 56a and 56b face each other in a width direction (direction perpendicular to both extending direction and the depth direction) of each of the grooves 56. A light passage opening 57a is formed in the side surface 56a and a light passage opening 57b is formed in the side surface 56b.

In the present embodiment, each of the grooves 56 is formed such that both end portions in the extending direction of the groove 56 are located in the third wall portion 53 and the fourth wall portion 54, respectively. The side surface 56a is cut out by a space between the third wall portion 53 and the fourth wall portion 54 facing each other in the Y direction, so that the light passage opening 57a is formed in the side surface 56a. The side surface 56b is cut out by the space, so that the light passage opening 57b is formed in the side surface 56b. In addition, the bottom surface 56c is separated into two regions in the Y direction.

In the corresponding groove 56 and beam splitter 3, the groove 56 has a width (namely, a distance between the pair of the side surfaces 56a and 56b) twice or more the thickness of the beam splitter 3. As one example, the thickness of the beam splitter 3 is 0.5 mm, and the width of the groove 56 is 2.5 mm to 3.0 mm. In the corresponding groove 56 and beam splitter 3, the beam splitter 3 is disposed in the groove 56 so as to be in contact with the side surface 56a and the bottom surface 56c, the side surface 56a being located on the one side of the pair of side surfaces 56a and 56b in the Z direction. In this state, the beam splitter 3 is fixed to the side surface 56a and the bottom surface 56c with, for example, adhesive agent.

As illustrated in FIG. 1, in the spectroscopic module 1, a light incident portion 10 is formed of the first light incident hole 2a and the second light incident hole 5a. The light incident portion 10 defines light to be incident on the plurality of beam splitters 3 along the X direction. The second light incident hole 5a includes the first light incident hole 2a when seen in the X direction. In this case, a center line of the first light incident hole 2a is an optical axis A of the light incident portion 10. As one example, when seen in the X direction, the first light incident hole 2a has a circular shape, and the second light incident hole 5a has an oval shape having the Z direction as a longitudinal direction. As one example, when seen in the X direction, the first light incident hole 2a overlaps a portion on the one side in the Z direction of the second light incident hole 5a. Accordingly, when the beam splitters 3 are disposed in the first support body 5, the centers of the beam splitters 3 can be confirmed through the first light incident hole 2a and the second light incident hole 5a.

Figure 4:
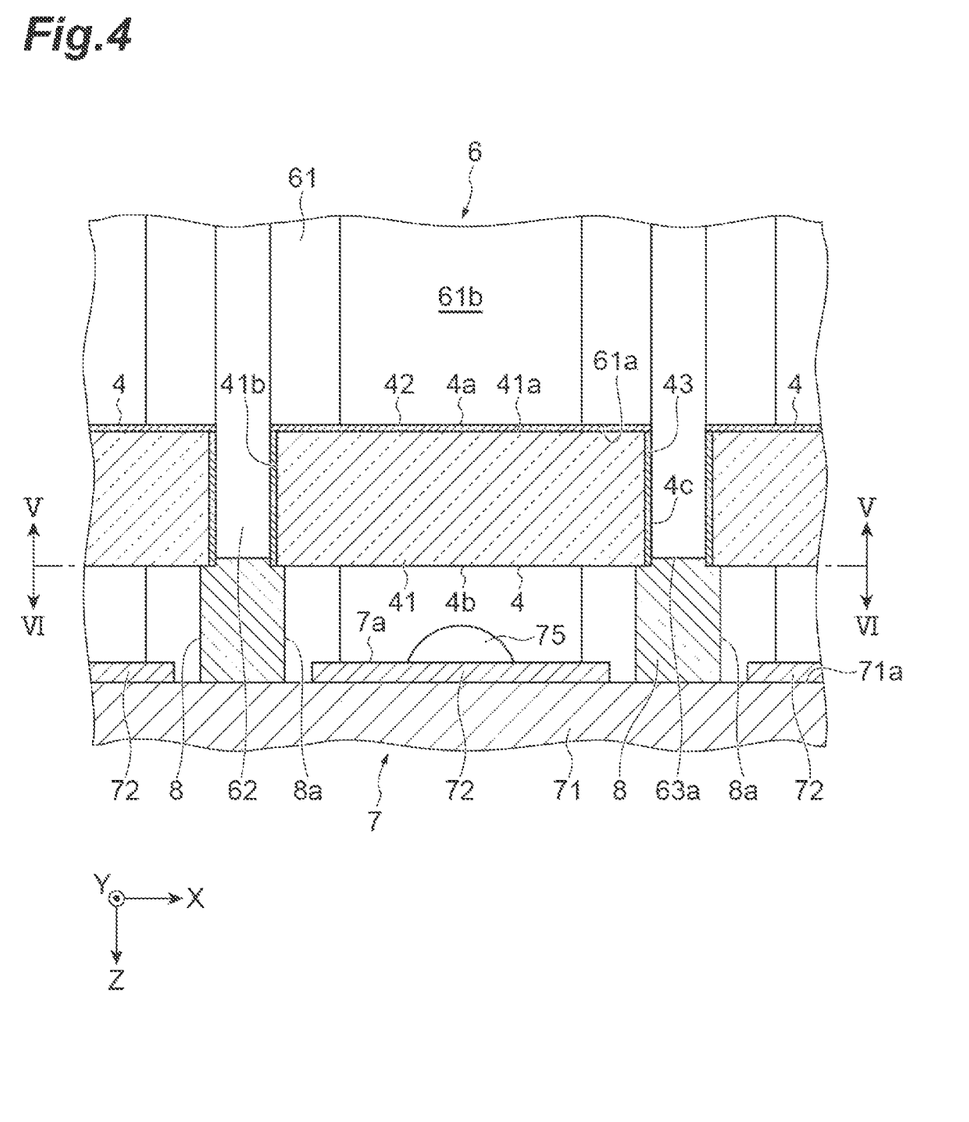
FIG. 4 is a cross-sectional view of a portion of a second support body illustrated in FIG. 1.
Figure 5:
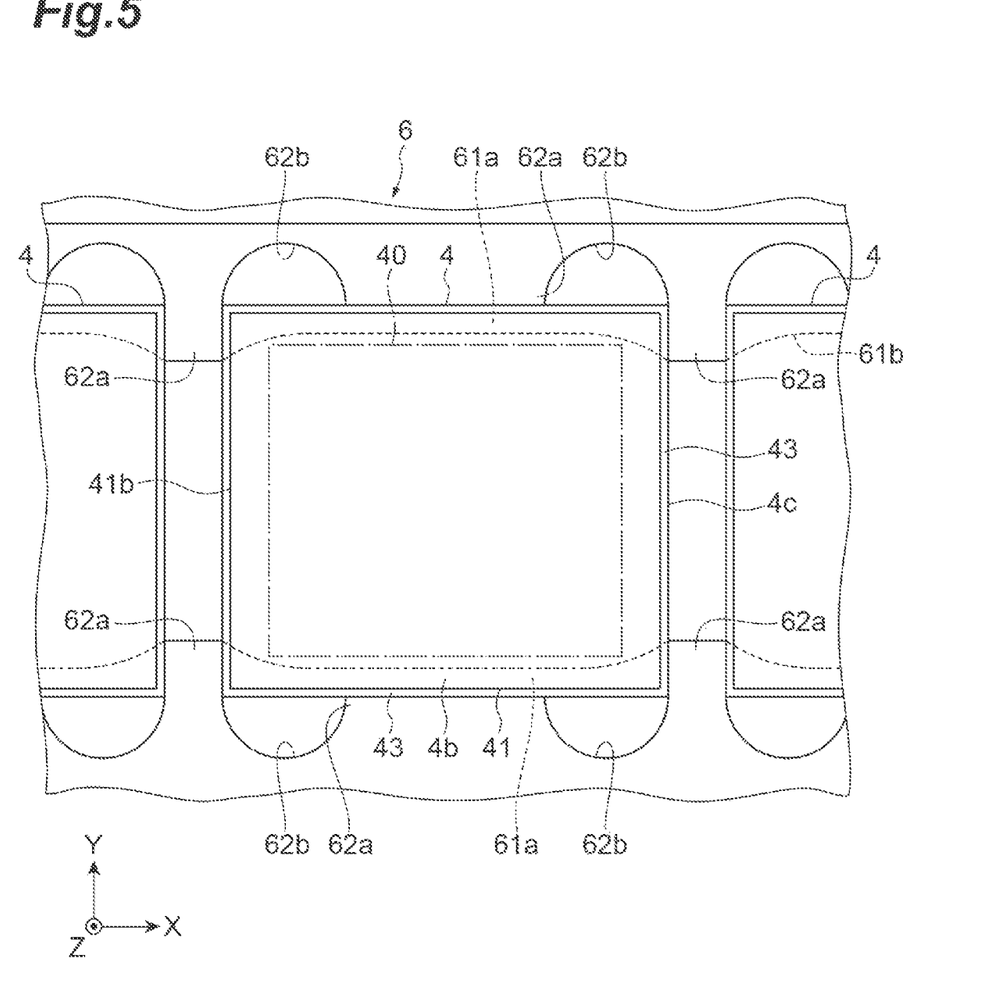
FIG. 5 is a cross-sectional view along line V-V illustrated in FIG. 4.

As illustrated in FIGS. 4 and 5, the second support body 6 supports the plurality of bandpass filters 4. Each of the bandpass filters 4 includes a light transmitting substrate 41, an interference film 42, and a light shielding film 43. The light transmitting substrate 41 has, for example, a rectangular plate shape. The interference film 42 is provided on a light incident surface 41a of the light transmitting substrate 41. The interference film 42 is, for example, a dielectric multilayer film. The light shielding film 43 is provided on a side surface 41b of the light transmitting substrate 41. The light shielding film 43 is, for example, a black paint film. In each of the bandpass filters 4, a surface on an opposite side of the interference film 42 from the light transmitting substrate 41 is a light incident surface 4a of the bandpass filter 4, a surface on an opposite side of the light transmitting substrate 41 from the interference film 42 is a light outgoing surface 4b of the bandpass filter 4, and an outer surface of the light shielding film 43 is a side surface 4c of the bandpass filter 4. Incidentally, in FIGS. 1 and 2, each of the bandpass filters 4 is illustrated in a state where the configuration is simplified.

The second support body 6 includes a support portion 61. A support surface 61a is formed in the support portion 61 so as to be open to the one side in the Z direction. The fact that the support surface 61a is open to the one side in the Z direction means that when the support portion 61 is seen from the one side in the Z direction in a state where there is only the second support body 6, the support surface 61a is exposed (namely, that the support surface 61a is visible). The plurality of bandpass filters 4 are disposed on the support surface 61a to be arranged along the X direction. The support surface 61a is a surface perpendicular to the Z direction, and is formed in the support portion 61 such that a region on the light incident surface 4a of each of the bandpass filters 4 is in contact with the support surface 61a, the region being located outside a clear aperture 40. The clear aperture 40 is an effective opening region in which the function of the bandpass filter 4 is guaranteed. One light passage opening 61b through which a plurality of optical paths (dotted line illustrated in FIG. 1) from the plurality of beam splitters 3 to the plurality of bandpass filters 4 pass is formed in the support portion 61. Accordingly, the support surface 61a is separated into two regions in the Y direction.

The second support body 6 further includes a restriction portion 62. The restriction portion 62 is provided in the second support body 6 so as to be located on the one side in the Z direction with respect to the support portion 61. The restriction portion 62 restricts each of the bandpass filters 4 from moving in a direction perpendicular to the Z direction. The restriction portion 62 is formed of a plurality of contact portions 62a that are provided so as to be in contact with the side surface 4c of each of the bandpass filters 4, and a plurality of separation portions 62b that are provided so as to be separated from the side surface 4c of each of the bandpass filters 4. The restriction portion 62 does not completely partition the plurality of bandpass filters 4 off from each other. Namely, the plurality of bandpass filters 4 are separated from each other with a space interposed therebetween in a state where the movement thereof in the direction perpendicular to the Z direction is restricted by the restriction portion 62.

As illustrated in FIGS. 1 and 2, a recessed portion 63 which is open to the one side in the Z direction is formed in the second support body 6. A bottom surface 63a of the recessed portion 63 is a surface on an opposite side of the restriction portion 62 from the support portion 61. The distance between the support surface 61a and the bottom surface 63a in the Z direction is smaller than the thickness of each of the bandpass filters 4 (namely, a distance between the light incident surface 4a and the light outgoing surface 4b in the Z direction). Accordingly, a portion on an opposite side of each of the bandpass filters 4 from the support portion 61 protrudes from the bottom surface 63a, and the light outgoing surface 4b of each of the bandpass filters 4 is located on the one side in the Z direction from the bottom surface 63a (refer to FIG. 4). The bottom surface 63a is provided with a plurality of positioning pins (first engagement portion) 6a.

As illustrated in FIGS. 1 and 2, the light detector 7 includes a wiring substrate 71, a plurality of light detection elements 72, and a connector 73. The plurality of light detection elements 72 are mounted on a surface 71a to be arranged along the X direction, the surface 71a being on a plurality of bandpass filters 4 side of the wiring substrate 71. Each of the light detection elements 72 is a discrete semiconductor element such as a PD chip, and has the light receiving region 7a. The connector 73 is attached to a surface 71b, the surface 71b being on an opposite side of the wiring substrate 71 from the surface 71a. The connector 73 is a port through which an electric signal or the like is input to and output from each of the light detection elements 72. The connector 73 extends outside the casing 2 through an opening 26a formed in the shield cover 26. The light detector 7 is attached to the second support body 6 so as to close an opening of the recessed portion 63. In the present embodiment, the wiring substrate 71 is attached to the second support body 6 to close the opening of the recessed portion 63, and the plurality of light detection elements 72 are disposed in the recessed portion 63.

The light shielding member 8 is disposed between the plurality of bandpass filters 4 and the light detector 7. The light shielding member 8 is made of an elastic material, and is disposed in the recessed portion 63 of the second support body 6 in a state where the light shielding member 8 is compressed. In this state, the plurality of bandpass filters 4 are held between the support portion 61 of the second support body 6 and the light shielding member 8. A plurality of light passage openings 8a are formed in the light shielding member 8. Each of a plurality of optical paths from the plurality of bandpass filters 4 to the plurality of light receiving regions 7a passes through each of the plurality of light passage openings 8a. Namely, the plurality of optical paths from the plurality of bandpass filters 4 to the plurality of light receiving regions 7a are separated from each other by the light shielding member 8. In the present embodiment, each of the light detection elements 72 of the light detector 7 is located inside each of the light passage openings 8a of the light shielding member 8. In each of the light passage openings 8a, a terminal of the light detection element 72 and a terminal of the wiring substrate 71 are electrically connected by a wire 74, and the wire 74 is covered with a resin member 75.

Figure 6:
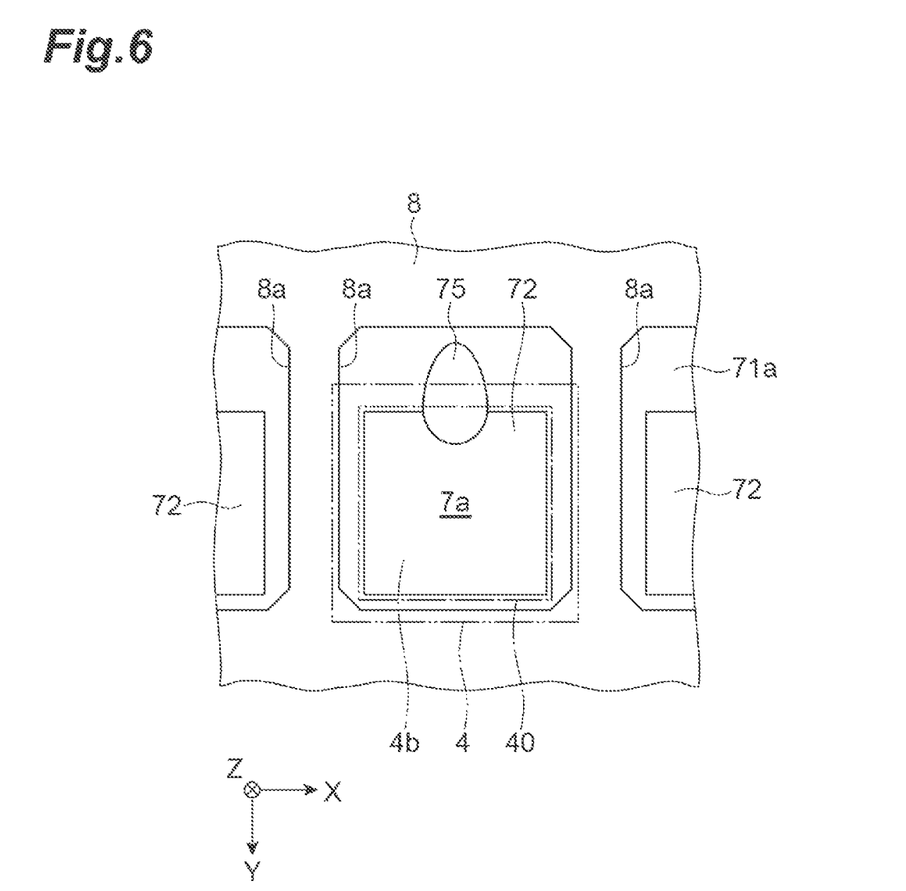
FIG. 6 is a cross-sectional view along line VI-VI illustrated in FIG. 4.

As illustrated in FIG. 6, each of the light passage openings 8a is formed in the light shielding member 8 such that a region on the light outgoing surface 4b of each of the bandpass filters 4 is in contact with the light shielding member 8, the region being located outside the clear aperture 40. Namely, the light shielding member 8 is formed such that a region on the light outgoing surface 4b of each of the bandpass filters 4 is in contact with the light shielding member 8, the region being located outside the clear aperture 40. Incidentally, in FIG. 6, the bandpass filter 4 is illustrated with an alternate long and two short dashes line.

As illustrated in FIG. 2, a plurality of positioning holes (second engagement portion) 8b are formed in the light shielding member 8. A plurality of positioning holes 7b are formed in the wiring substrate 71. Each of the positioning holes 7b overlaps each of the positioning holes 8b when seen in the Z direction. The light shielding member 8 is disposed in the recessed portion 63 in a state where each of the positioning pins 6a of the second support body 6 is fitted into each of the positioning holes 8b, to define the position of each of the light passage openings 8a in the direction perpendicular to the Z direction. The light detector 7 is attached to the second support body 6 in a state where each of the positioning pins 6a which has penetrated through the positioning hole 8b of the light shielding member 8 is fitted into each of the positioning holes 7b, to define the position of each of the light receiving regions 7a in the direction perpendicular to the Z direction.

Figure 7:
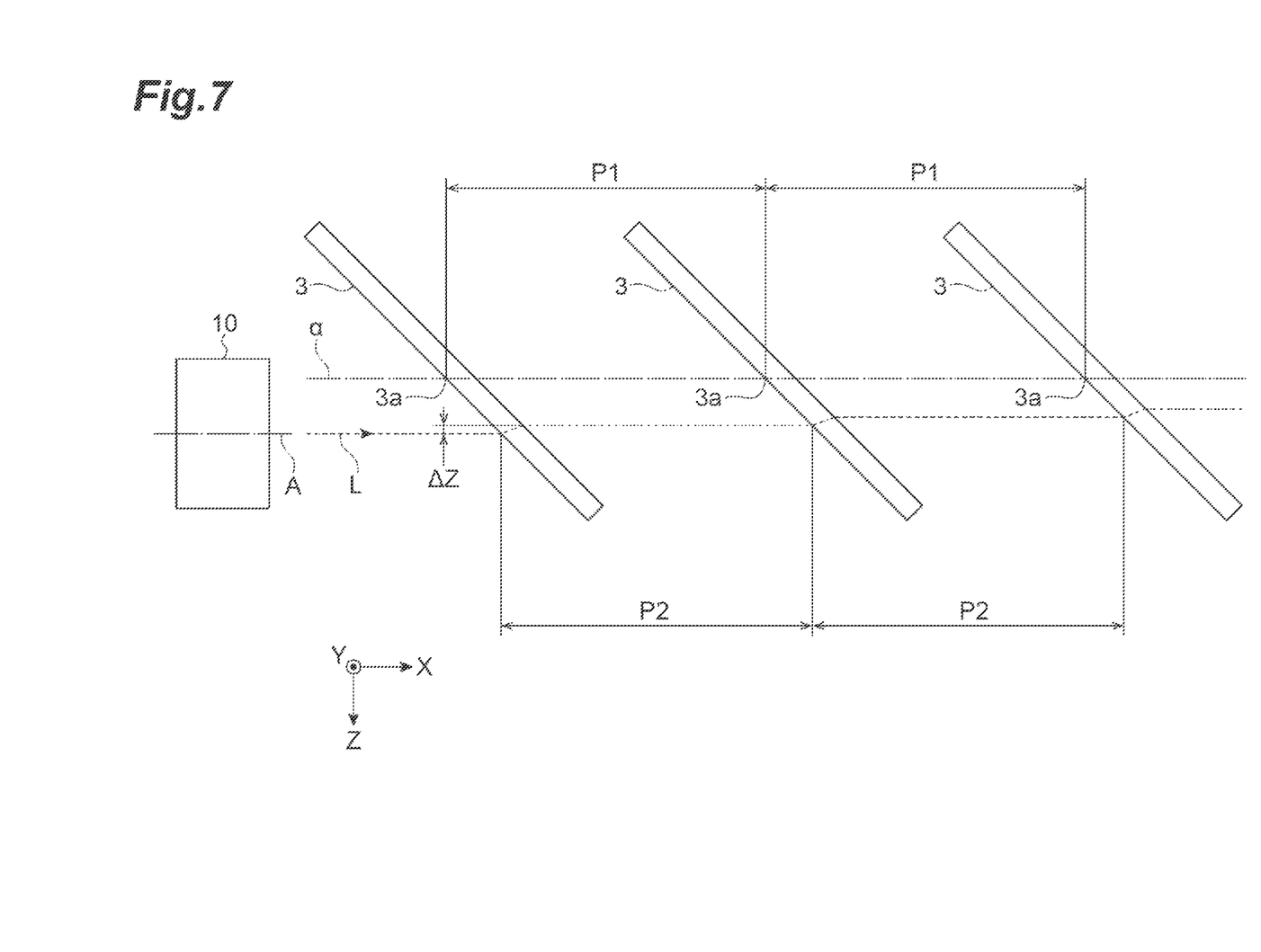
FIG. 7 is a view illustrating the dispositional relationship of a plurality of beam splitters with respect to the optical axis of a light incident portion.

As illustrated in FIG. 7, the plurality of beam splitters 3 are disposed such that a center 3a of each of the beam splitters 3 is located on a line α parallel to the X direction. The center 3a of the beam splitter 3 is the center (center of gravity) of the beam splitter 3 when seen in the thickness direction of the beam splitter 3. The beam splitters 3 each have the same thickness of 1 mm or less, and are disposed such that light is incident at an angle of incidence of 45° along the X direction. The optical axis A of the light incident portion 10 is located on the one side in the Z direction with respect to the line α passing through the center 3a of each of the beam splitters 3. Incidentally, in FIG. 7, the light incident portion 10 is schematically illustrated.

Since refraction of light occurs in each of the beam splitters 3, the optical axis of transmitted light is shifted to a side away from the optical axis A of the light incident portion 10 with respect to the optical axis of incident light. In the spectroscopic module 1, since the beam splitters 3 each have the same thickness and the beam splitters 3 each are disposed such that light is incident at an angle of incidence of 45° along the X direction, the beam splitters 3 each have the same amount of light refraction. The amount of light refraction means an amount by which the optical axis of the transmitted light is shifted to the side away from the optical axis A of the light incident portion 10 with respect to the optical axis of the incident light in the beam splitter 3.

When the amount of light refraction in each of the beam splitters 3 is $\Delta Z$ and the number of the beam splitters 3 is M, the distance between "the optical axis of light incident on the beam splitter 3 of the foremost stage" and "the optical axis of light incident on the beam splitter 3 of the rearmost stage" in the Z direction is $\Delta Z(M-1)$. The beam splitter 3 of the foremost stage means the beam splitter 3 disposed in the foremost stage (on an upstream side in a traveling direction of light), and the beam splitter 3 of the rearmost stage means the beam splitter 3 disposed in the rearmost stage (on a downstream side in the traveling direction of light).

In the spectroscopic module 1, the plurality of beam splitters 3 are disposed with respect to the optical axis A of the light incident portion 10 such that the distance between the optical axis A and the line α in the Z direction is $\Delta Z(M-1)/2$. Accordingly, in the beam splitter 3 disposed in a middle stage (on a midstream side in the traveling direction of light), the optical axis of incident light passes through the center 3a or the vicinity of the center 3a of the beam splitter 3.

As one example, when the thickness of each of the beam splitters 3 is 0.5 mm, the refractive index is 1.5, the angle of incidence to the beam splitter 3 is 45°, and the number of the beam splitters 3 disposed is 10, the value of an amount $\Delta Z$ of light refraction is 0.165 mm. Therefore, the distance between the optical axis A and the line α in the Z direction is $\Delta Z(M-1)/2=0.165\times(10-1)/2$=approximately 0.74 mm. In this case, in each of the beam splitters 3 of a fifth stage and a sixth stage from the foremost stage, the optical axis of incident light passes through the vicinity of the center 3a of the beam splitter 3. When the diameter of the measurement light L which is defined by the light incident portion 10 (namely, the diameter of light incident on the beam splitter 3 of the foremost stage) is 4 mm, if the length in the longitudinal direction of each of the beam splitters 3 is 10 mm, the incident light is contained in the clear apertures in all the beam splitters 3.

In the spectroscopic module 1, the arrangement pitch of the plurality of beam splitters 3 is a value obtained by adding the amount of light refraction in each of the beam splitters 3 to the arrangement pitch of the plurality of light receiving regions 7a. The arrangement pitch of the plurality of beam splitters 3 means "a distance between the centers 3a of the beam splitters 3 adjacent to each other" when the plurality of beam splitters 3 are arranged at equal intervals along the X direction. The arrangement pitch of the plurality of light receiving regions 7a means "a distance between the centers of the light receiving regions 7a adjacent to each other" when the plurality of light receiving regions 7a are arranged at equal intervals along the X direction. When the arrangement pitch of the plurality of beam splitters 3 is P1 and the arrangement pitch of the plurality of light receiving regions 7a is P2, $P1=P2+\Delta Z$. Therefore, when the number of the beam splitters 3 is M, the distance between "the beam splitter 3 of the foremost stage" and "the beam splitter 3 of the rearmost stage" in the X direction is $P1(M-1)=(P2+\Delta Z)$ (M−1)=P2(M−1)+ΔZ(M−1). As described above, the arrangement pitch of the plurality of beam splitters 3 is cumulatively affected by not only the arrangement pitch of the plurality of light receiving regions 7a but also the amount of light refraction in each of the beam splitters 3.

From the above viewpoint, "in the entirety of the plurality of beam splitters 3, the total accumulated amount of light refraction is sufficiently reduced on the side away from the bandpass filters 4 and on a rear stage side in a direction in which the plurality of beam splitters 3 are lined up, so that the size of the entirety of the module is reduced", each of the beam splitters 3 preferably has a thickness of 1 mm or less, and more preferably has a thickness of 0.5 mm or less. However, from the viewpoint that the strength of the beam splitter 3 is secured, it is preferable that each of the beam splitters 3 has a thickness of 0.1 mm or more.

In the second support body 6 of the spectroscopic module 1, the plurality of bandpass filters 4 are disposed on the support surface 61a that is formed in the support portion 61 so as to be open to the one side in the Z direction. Here, in the second support body 6, the one side in the Z direction is a side opposite a side on which the plurality of beam splitters 3 are supported. For this reason, during production of the spectroscopic module 1, for example, even when damage or the like is found in the bandpass filter 4 after the first support body 5 which supports the plurality of beam splitters 3 is attached to the second support body 6, the removal of the first support body 5 from the second support body 6 for the replacement of the bandpass filter 4 is not required. In addition, the timing when the plurality of bandpass filters 4 are attached to the second support body 6 is not dependent on the timing when the first support body 5 which supports the plurality of beam splitters 3 is attached to the second support body 6. Further, when the plurality of bandpass filters 4 are attached to the second support body 6, each of the bandpass filters 4 is visible from the one side in the Z direction. As a result, according to the spectroscopic module 1, the production efficiency can be improved.

In addition, in the spectroscopic module 1, the second support body 6 is provided with the restriction portion 62 that restricts each of the bandpass filters 4 from moving in the direction perpendicular to the Z direction. Accordingly, the positional accuracy of each of the bandpass filters 4 can be secured without using, for example, adhesive agent or the like. In addition, since adhesive agent or the like is not interposed between each of the bandpass filters 4 and the second support body 6, the positional accuracy of each of the bandpass filters 4 with respect to the second support body 6 can be further increased.

In addition, in the spectroscopic module 1, the restriction portion 62 is formed of the plurality of contact portions 62a that are provided so as to be in contact with the side surface 4c of each of the bandpass filters 4, and the plurality of separation portions 62b that are provided so as to be separated from the side surface 4c of each of the bandpass filters 4. Accordingly, during production of the spectroscopic module 1, when damage or the like is found in the bandpass filter 4, for example, the bandpass filter 4 can be easily removed from the second support body 6 by inserting a jig between the bandpass filter 4 and the separation portions 62b.

In addition, in the spectroscopic module 1, the one light passage opening 61b through which the plurality of optical paths from the plurality of beam splitters 3 to the plurality of bandpass filters 4 pass is formed in the support portion 61. Accordingly, the structure of the support portion 61 can be simplified.

In addition, in the spectroscopic module 1, the support surface 61a is formed in the support portion 61 such that a region on the light incident surface 4a of each of the bandpass filters 4 is in contact with the support surface 61a, the region being located outside the clear aperture 40. Accordingly, the function of each of the bandpass filters 4 is sufficiently exhibited. Therefore, the S/N ratio of an electric signal output from each of the light receiving regions 7a can be improved. Namely, in the spectroscopic module 1, since the support surface 61a is in contact with the region on the light incident surface 4a, the region being located outside the clear aperture 40, the effective opening area of each of the bandpass filters 4 can be utilized to the maximum.

In addition, in the spectroscopic module 1, the light shielding member 8 is disposed between the plurality of bandpass filters 4 and the light detector 7, and the plurality of optical paths from the plurality of bandpass filters 4 to the plurality of light receiving regions 7a are separated from each other by the light shielding member 8. Accordingly, it is possible to suppress occurrence of optical crosstalk between the light receiving regions 7a adjacent to each other.

In addition, in the spectroscopic module 1, the plurality of bandpass filters 4 are held between the support portion 61 and the light shielding member 8. Accordingly, each of the bandpass filters 4 can be reliably held without using, for example, adhesive agent or the like. In addition, since a gap between each of the bandpass filters 4 and the light shielding member 8 is small, it is possible to reliably suppress occurrence of optical crosstalk between the light receiving regions 7a adjacent to each other.

In addition, in the spectroscopic module 1, the light shielding member 8 is made of an elastic material. Accordingly, the light shielding member 8 can be in contact with each of the bandpass filters 4 while each of the bandpass filters 4 is suppressed from being damaged. Therefore, it is possible to reliably suppress occurrence of optical crosstalk between the light receiving regions 7a adjacent to each other.

In addition, in the spectroscopic module 1, the recessed portion 63 which is open to the one side in the Z direction is formed in the second support body 6, the distance between the support surface 61a and the bottom surface 63a of the recessed portion 63 in the Z direction is smaller than the thickness of each of the bandpass filters 4, the light detector 7 is attached to the second support body 6 so as to close the opening of the recessed portion 63, and the light shielding member 8 is disposed in the recessed portion 63 in a state where the light shielding member 8 is compressed. Accordingly, each of the bandpass filters 4 can be more reliably held. In addition, since the light shielding member 8 can be reliably in contact with each of the bandpass filters 4 and the light detector 7, it is possible to more reliably suppress occurrence of optical crosstalk between the light receiving regions 7a adjacent to each other. Particularly, since each of the bandpass filters 4 is interposed between the second support body 6 made of a relatively hard metal and the light shielding member 8 made of an elastic material, each of the bandpass filters 4 can be stably held while each of the bandpass filters 4 is suppressed from being damaged.

In addition, in the spectroscopic module 1, the plurality of positioning holes 8b are formed in the light shielding member 8, and are provided in the second support body 6, each of the plurality of positioning pins 6a fitted into each of the plurality of positioning holes 8b. Accordingly, with a simple structure, the light shielding member 8 can be positioned with respect to the second support body 6, so that the light passage openings 8a of the light shielding member 8 can be positioned with respect to the bandpass filters 4, respectively.

In addition, in the spectroscopic module 1, the light shielding member 8 is formed such that a region on the light outgoing surface 4b of each of the bandpass filters 4 is in contact with the light shielding member 8, the region being located outside the clear aperture 40. Accordingly, the function of each of the bandpass filters 4 is sufficiently exhibited. Therefore, the S/N ratio of an electric signal output from each of the light receiving regions 7a can be improved. In addition, in the spectroscopic module 1, since the light shielding member 8 is in contact with the region on the light outgoing surface 4b, the region being located outside the clear aperture 40, the effective opening area of each of the bandpass filters 4 can be utilized to the maximum.

In addition, in the spectroscopic module 1, the plurality of bandpass filters 4 are separated from each other with a space interposed therebetween, and the light shielding film 43 is provided on the side surface 41b of the light transmitting substrate 41 in each of the bandpass filters 4. Accordingly, for example, even when a wall portion or the like is not provided between the bandpass filters 4 adjacent to each other, stray light can be suppressed from being incident from the side surface 41b of the light transmitting substrate 41 in each of the bandpass filters 4. Further, since stray light is suppressed from being incident from the side surface 41b of the light transmitting substrate 41, the stray light can be suppressed from entering a light detector 7 side from each of the bandpass filters 4. In addition, since the plurality of bandpass filters 4 are separated from each other with a space interposed therebetween, the bandpass filters 4 adjacent to each other in the X direction can be brought close to each other to shorten the optical path length, and as a result, a loss in amount of light can be reduced. For this reason, the amplification factor of an electric signal in a circuit of the wiring substrate 71 can be suppressed, and the S/N ratio can be further improved. Further, since the length in the X direction of the casing 2 can be reduced, the size of the spectroscopic module 1 can be reduced.

In addition, in the spectroscopic module 1, the interference film 42 is provided on the light incident surface 41a of the light transmitting substrate 41 in each of the bandpass filters 4. Accordingly, the generation of stray light by diffused reflection in the light transmitting substrate 41 of each of the bandpass filters 4 can be suppressed. Further, stray light can be suppressed from entering the light detector 7 side from each of the bandpass filters 4.

In addition, in the spectroscopic module 1, the plurality of light detection elements 72 are mounted on the surface 71a of the wiring substrate 71 to form the light detector 7. In a PD array or the like in which the plurality of light receiving regions 7a are formed on one semiconductor substrate, electrical crosstalk may occur in the one semiconductor substrate, which is a problem; however, since the plurality of light detection elements 72 which are electrically independent of each other are used, an insulation can be provided between the light receiving regions 7a adjacent to each other, so that such the situation can be reliably prevented.

The present disclosure is not limited to the above embodiment. For example, in the embodiment, the plurality of beam splitters 3 are arranged along the first direction (X direction), and the plurality of bandpass filters 4 and the like are disposed on the one side in the second direction (Z direction) with respect to the plurality of beam splitters 3. Namely, in the above embodiment, the second direction (Z direction) is a direction perpendicular to the first direction (X direction); however, the second direction may be a direction intersecting the first direction. In addition, in the above embodiment, the meaning of "to be in contact with" is not limited to a case where a member and a member are in contact with each other, and includes a case where a film such as adhesive agent is disposed between a member and a member.

In addition, the casing 2 may accommodate at least the plurality of beam splitters 3 and the plurality of bandpass filters 4. In addition, a portion of the casing 2 may be formed of a portion of at least one of the first support body 5, the second support body 6, and the light detector 7. In addition, the first support body 5 and the second support body 6 may be integrally formed. In addition, the light outgoing surface 4b of each of the bandpass filters 4 is located on the one side in the Z direction from the bottom surface 63a of the recessed portion 63 in which the light shielding member 8 is disposed, but may be located at the same position as that of the bottom surface 63a.

In addition, each of the beam splitters 3 may be a dichroic mirror that reflects light in different wavelength bands and transmits light other than the light in the reflected wavelength bands. In addition, each of the beam splitters 3 is not limited to having a plate shape, and may have a block shape. In addition, as long as each of the beam splitters 3 has a long shape when seen in the thickness direction of each of the beam splitters 3, each of the beam splitters 3 may have a polygonal shape, an elliptical shape, or the like as a specific shape. In addition, the plurality of beam splitters 3 may be formed, for example, by forming at least two dielectric multilayer films on one preform. Namely, a plurality of portions, each of which functions as the beam splitter 3, may be provided, and the preform on which each of the plurality of portions is disposed is not required to be divided. In addition, the plurality of bandpass filters 4 may be formed, for example, by forming at least two dielectric multilayer films on one preform. Namely, a plurality of portions, each of which functions as the bandpass filter 4, may be provided, and the preform on which each of the plurality of portions is disposed is not required to be divided. In addition, the light detector 7 may be a PD array or the like in which the plurality of light receiving regions 7a are formed on one semiconductor substrate. In addition, the light detector 7 may be a photomultiplier tube.

In addition, the second support body 6 is not limited to the configuration of the above embodiment. A support region may be formed in the support portion of the second support body 6 so as to be open to the one side in the Z direction, and the plurality of bandpass filters 4 may be disposed in the support region. Also in the spectroscopic module 1 described above, in the second support body 6, the plurality of bandpass filters 4 are disposed in the support region, the support region formed in the support portion so as to be open to the one side in the Z direction, and in the second support body 6, the one side in the Z direction is the side opposite the side on which the plurality of beam splitters 3 are supported. For this reason, during production of the spectroscopic module 1, for example, even when damage or the like is found in the bandpass filter 4 after the first support body 5 which supports the plurality of beam splitters 3 is attached to the second support body 6, the removal of the first support body 5 from the second support body 6 for the replacement of the bandpass filter 4 is not required. In addition, the timing when the plurality of bandpass filters 4 are attached to the second support body 6 is not dependent on the timing when the first support body 5 which supports the plurality of beam splitters 3 is attached to the second support body 6. Further, when the plurality of bandpass filters 4 are attached to the second support body 6, each of the bandpass filters 4 is visible from the one side in the Z direction. As a result, according to the spectroscopic module 1 described above, the production efficiency can be improved.

Figure 8:
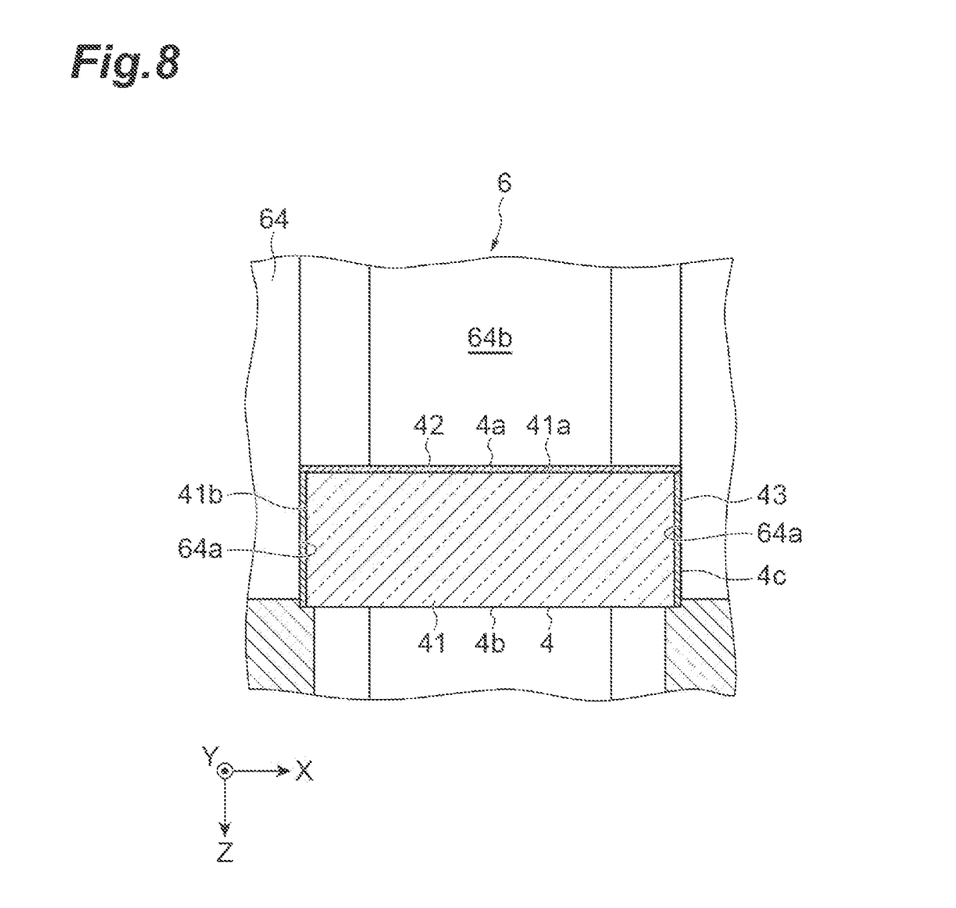
FIG. 8 is a cross-sectional view of a portion of a second support body of a first modification example.

An example of the support portion in which the support region is formed will be described below. As one example, the second support body 6 illustrated in FIG. 8 includes a support portion 64 in which a support region 64a which is a support surface is formed. The support region 64a is a surface parallel to the Z direction, and is formed so as to be open to the one side in the Z direction. The fact that the support region 64a is open to the one side in the Z direction means that when the support portion 64 is seen from the one side in the Z direction in a state where there is only the second support body 6, any member is not provided up to the support region 64a. The plurality of bandpass filters 4 are disposed in the support region 64a to be arranged along the X direction. The support region 64a is a surface parallel to the Z direction, and is formed in the support portion 64 such that the side surface 4c of each of the bandpass filters 4 is in contact with the support region 64a. In the example illustrated in FIG. 8, in addition to the above-described improvement in production efficiency, as compared with when the support surface perpendicular to the Z direction is formed in the support portion 64, the optical path length between each of the beam splitters 3 and each of the bandpass filters 4 can be shortened, and a loss in amount of light can be reduced. For this reason, the amplification factor of an electric signal in a circuit of the wiring substrate 71 can be suppressed, and the S/N ratio can be further improved. In addition, in the example illustrated in FIG. 8, as compared with when the support surface perpendicular to the Z direction is formed, production can be further facilitated.

Figure 9:
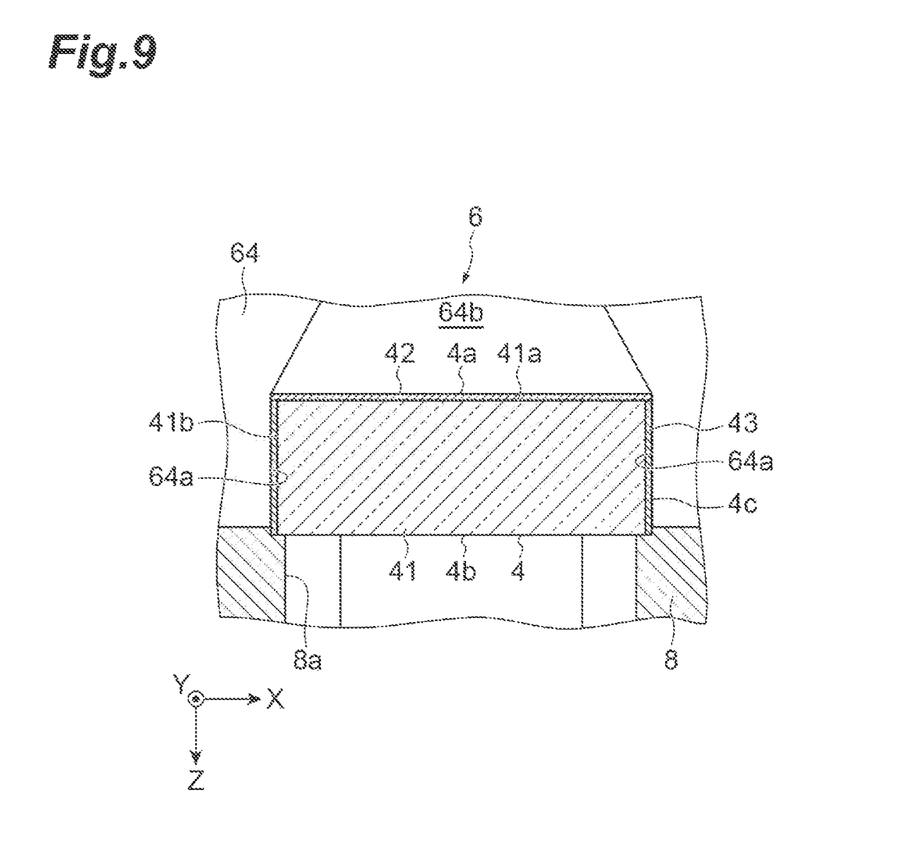
FIG. 9 is a cross-sectional view of a portion of a second support body of a second modification example.
Figure 10:
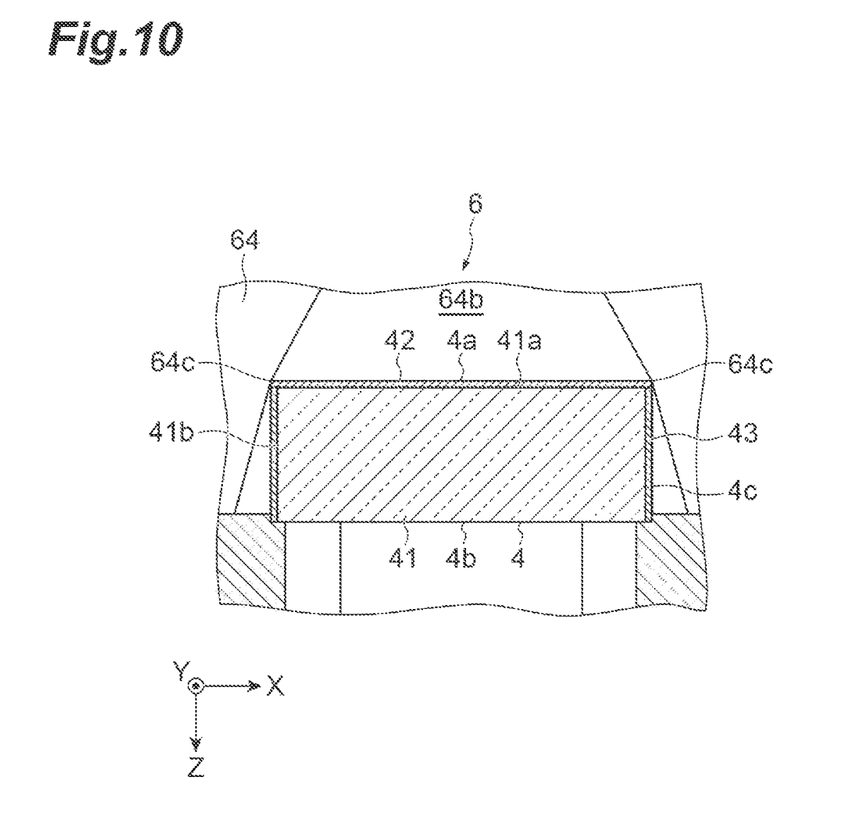
FIG. 10 is a cross-sectional view of a portion of a second support body of a third modification example.

Incidentally, as in the example illustrated in FIG. 9, the support portion 64 may be formed in a portion in which a light passage opening 64b is formed, to be inclined to a center side of the light passage opening 64b. In addition, as in the example illustrated in FIG. 10, the second support body 6 may include the support portion 64 in which a support region 64c linearly extending along the Y direction is formed. The support region 64c is a connecting portion between a light passage opening 64b side surface and a bandpass filter 4 side surface which are inclined at different angles in the support portion 64. The plurality of bandpass filters 4 are disposed in the support region 64c to be arranged along the X direction. The support region 64c is formed in the support portion 64 such that a portion of a corner formed by the light incident surface 4a and the side surface 4c of each of the bandpass filters 4 is in contact with the support region 64c, the portion extending along the Y direction.

In addition, in the above embodiment, the casing 2 includes the plurality of positioning holes 2c as a defining portion; however, at least one of the second support body 6 and the casing 2 may include a defining portion that defines the position of the first support body 5 in a plane parallel to both the X direction and the Z direction. The defining portion provided in the second support body 6 and the casing 2 may be, for example, a contact region that is provided in the side surface 92 of the recessed portion 9 so as to be in contact with the first support body 5, the first support body 5 disposed in the recessed portion 9. In addition, the first support body 5 may include a first engagement portion, and the casing 2 may include a second engagement portion, the second engagement portion engaged with the first engagement portion. In that case, one of the first engagement portion and the second engagement portion may be formed of a plurality of positioning holes, and the other of the first engagement portion and the second engagement portion may be formed of positioning pins, each of the positioning pins fitted into each of the plurality of positioning holes.

In addition, in the above embodiment, the second support body 6 includes the positioning pins 6a, and the light shielding member 8 includes the positioning holes 8b; however, the second support body 6 may include a first engagement portion, and the light shielding member 8 may include a second engagement portion engaged with the first engagement portion. In that case, one of the first engagement portion and the second engagement portion may be formed of a plurality of positioning holes, and the other of the first engagement portion and the second engagement portion may be formed of positioning pins, each of the positioning pins fitted into each of the plurality of positioning holes.

In addition, when the beam splitter 3 has a plate shape and has a thickness of 1 mm or less (more preferably, a thickness of 0.5 mm or less), if the number of all the beam splitters 3 is M (M is a natural number of 2 or more), each of N (N is a natural number of 2 to M) beam splitters 3 among M beam splitters 3 may have a plate shape and have a thickness of 1 mm or less (more preferably, a thickness of 0.5 mm or less). Incidentally, all the beam splitters 3 each may have a plate shape and have a thickness of 1 mm or less (more preferably, a thickness of 0.5 mm or less) (the case of M=N).

In addition, each of the bandpass filters 4 may be fixed to the second support body 6 with adhesive agent. In that case, each of the bandpass filters 4 may not be held between the support portion 61 and the light shielding member 8.

According to one aspect of the present disclosure, there is provided a spectroscopic module including: a plurality of beam splitters that are arranged along a first direction; a plurality of bandpass filters that are disposed on one side in a second direction intersecting the first direction with respect to the plurality of beam splitters, each of the plurality of bandpass filters facing each of the plurality of beam splitters; a light detector that is disposed on the one side in the second direction with respect to the plurality of bandpass filters and includes a plurality of light receiving regions, each of the plurality of light receiving regions facing each of the plurality of bandpass filters; and a support body that supports the plurality of beam splitters and the plurality of bandpass filters, wherein the support body includes a support portion in which a support surface is formed so as to be open to the one side in the second direction, and the plurality of bandpass filters are disposed on the support surface.

In the support body of the spectroscopic module, the plurality of bandpass filters are disposed on the support surface that is formed in the support portion so as to be open to the one side in the second direction. Here, in the support body, the one side in the second direction is a side opposite a side on which the plurality of beam splitters are supported. For this reason, during production of the spectroscopic module, for example, even when damage or the like is found in a bandpass filter after the plurality of beam splitters and the plurality of bandpass filters are attached to the support body, the removal of the beam splitters from the support body for the replacement of the bandpass filter is not required. As a result, according to the spectroscopic module, the production efficiency can be improved.

In the spectroscopic module according to one aspect of the present disclosure, the support body may further include a restriction portion that restricts each of the plurality of bandpass filters from moving in a direction perpendicular to the second direction. Accordingly, the positional accuracy of each of the plurality of bandpass filters can be secured.

In the spectroscopic module according to one aspect of the present disclosure, the restriction portion may be formed of a plurality of contact portions that are provided so as to be in contact with a side surface of each of the plurality of bandpass filters, and a plurality of separation portions that are provided so as to be separated from the side surface. Accordingly, for example, when damage or the like is found in a bandpass filter, for example, the bandpass filter can be easily removed from the support body by inserting a jig between the bandpass filter and the separation portions.

In the spectroscopic module according to one aspect of the present disclosure, one light passage opening through which a plurality of optical paths from the plurality of beam splitters to the plurality of bandpass filters pass may be formed in the support portion. Accordingly, the structure of the support portion can be simplified.

In the spectroscopic module according to one aspect of the present disclosure, the support surface may be formed in the support portion such that a region on a light incident surface of each of the plurality of bandpass filters is in contact with the support surface, the region being located outside a clear aperture. Accordingly, the function of each of the plurality of bandpass filters is sufficiently exhibited. Therefore, the S/N ratio of an electric signal output from each of the plurality of light receiving regions can be improved.

The spectroscopic module according to one aspect of the present disclosure may further include a light shielding member that is disposed between the plurality of bandpass filters and the light detector, wherein a plurality of optical paths from the plurality of bandpass filters to the plurality of light receiving regions may be separated from each other by the light shielding member. Accordingly, it is possible to suppress occurrence of optical crosstalk between the light receiving regions adjacent to each other.

In the spectroscopic module according to one aspect of the present disclosure, the plurality of bandpass filters may be held between the support portion and the light shielding member. Accordingly, each of the plurality of bandpass filters can be reliably held. In addition, since a gap between each of the plurality of bandpass filters and the light shielding member is small, it is possible to reliably suppress occurrence of optical crosstalk between the light receiving regions adjacent to each other.

In the spectroscopic module according to one aspect of the present disclosure, the light shielding member may be made of an elastic material. Accordingly, the light shielding member can be in contact with each of the plurality of bandpass filters while each of the plurality of bandpass filters is suppressed from being damaged. Therefore, it is possible to more reliably suppress occurrence of optical crosstalk between the light receiving regions adjacent to each other.

In the spectroscopic module according to one aspect of the present disclosure, a recessed portion which is open to the one side in the second direction may be formed in the support body, a distance between the support surface and a bottom surface of the recessed portion in the second direction may be smaller than a thickness of each of the plurality of bandpass filters, the light detector may be attached to the support body so as to close an opening of the recessed portion, and the light shielding member may be disposed in the recessed portion in a state where the light shielding member is compressed. Accordingly, each of the plurality of bandpass filters can be more reliably held. In addition, since the light shielding member can be reliably in contact with each of the plurality of bandpass filters and the light detector, it is possible to more reliably suppress occurrence of optical crosstalk between the light receiving regions adjacent to each other.

In the spectroscopic module according to one aspect of the present disclosure, the support body may further include a first engagement portion, and the light shielding member may include a second engagement portion engaged with the first engagement portion. Accordingly, the light shielding member can be positioned with respect to the support body such that the function of the light shielding member is reliably exhibited.

In the spectroscopic module according to one aspect of the present disclosure, one of the first engagement portion and the second engagement portion may be formed of a plurality of positioning holes, and the other of the first engagement portion and the second engagement portion may be formed of a plurality of positioning pins, each of the plurality of positioning pins fitted into each of the plurality of positioning holes. Accordingly, with a simple structure, the light shielding member can be positioned with respect to the support body.

In the spectroscopic module according to one aspect of the present disclosure, the light shielding member may be formed such that a region on a light outgoing surface of each of the plurality of bandpass filters is in contact with the light shielding member, the region being located outside a clear aperture. Accordingly, the function of each of the plurality of bandpass filters is sufficiently exhibited. Therefore, the S/N ratio of an electric signal output from each of the plurality of light receiving regions can be improved.

In the spectroscopic module according to one aspect of the present disclosure, the plurality of bandpass filters may be separated from each other with a space interposed between the plurality of bandpass filters, and each of the plurality of bandpass filters may include a light transmitting substrate, and a light shielding film that is provided on a side surface of the light transmitting substrate. Accordingly, for example, even when a wall portion or the like is not provided between the bandpass filters adjacent to each other, stray light can be suppressed from being incident from the side surface of the light transmitting substrate in each of the plurality of bandpass filters.

In the spectroscopic module according to one aspect of the present disclosure, each of the plurality of bandpass filters may include a light transmitting substrate, and an interference film that is provided on a light incident surface of the light transmitting substrate. Accordingly, the generation of stray light by diffused reflection in the light transmitting substrate of each of the plurality of bandpass filters can be suppressed.

In the spectroscopic module according to one aspect of the present disclosure, the light detector may include a wiring substrate that is attached to the support body, and a plurality of light detection elements that are mounted on a surface on a plurality of bandpass filters side of the wiring substrate, each of the plurality of light detection elements including each of the plurality of light receiving regions. In a PD array or the like in which the plurality of light receiving regions are formed on one semiconductor substrate, electrical crosstalk may occur in the one semiconductor substrate, which is a problem; however, since the plurality of light detection elements which are electrically independent of each other are used, an insulation can be provided between the light receiving regions adjacent to each other, so that such a situation can be reliably prevented.

According to another aspect of the present disclosure, there is provided a spectroscopic module including: a plurality of beam splitters that are arranged along a first direction; a plurality of bandpass filters that are disposed on one side in a second direction intersecting the first direction with respect to the plurality of beam splitters, each of the plurality of bandpass filters facing each of the plurality of beam splitters; a light detector that is disposed on the one side in the second direction with respect to the plurality of bandpass filters and includes a plurality of light receiving regions, each of the plurality of light receiving regions facing each of the plurality of bandpass filters; and a support body that supports the plurality of beam splitters and the plurality of bandpass filters, wherein the support body includes a support portion in which a support region is formed so as to be open to the one side in the second direction and the plurality of bandpass filters are disposed in the support region.

In the support body of the spectroscopic module, the plurality of bandpass filters are disposed in the support region that is formed in the support portion so as to be open to the one side in the second direction. Here, in the support body, the one side in the second direction is a side opposite a side on which the plurality of beam splitters are supported. For this reason, during production of the spectroscopic module, for example, even when damage or the like is found in a bandpass filter after the plurality of beam splitters and the plurality of bandpass filters are attached to the support body, the removal of the beam splitters from the support body for the replacement of the bandpass filter is not required. As a result, according to the spectroscopic module, the production efficiency can be improved.

What is claimed is:

1. A spectroscopic module comprising:
a plurality of beam splitters that are arranged along a first direction;
a plurality of bandpass filters that are disposed on one side in a second direction intersecting the first direction with respect to the plurality of beam splitters, each of the plurality of bandpass filters facing each of the plurality of beam splitters;
a light detector that is disposed on the one side in the second direction with respect to the plurality of bandpass filters and includes a plurality of light receiving regions, each of the plurality of light receiving regions facing each of the plurality of bandpass filters;
a support body that supports the plurality of beam splitters and the plurality of bandpass filters; and
a light shielding portion that is disposed between the plurality of bandpass filters and the light detector, the light shielding portion having a plurality of light passage openings formed therein,
wherein each of a plurality of optical paths from the plurality of bandpass filters to the plurality of light receiving regions passes through each of the plurality of light passage openings,
a surface of each of the plurality of bandpass filters on a light detector side includes a first region corresponding to each of the plurality of light passage openings, and a second region located on both sides in the first direction with respect to the first region,
the second region is in contact with the light shielding portion, and
a width of the first region of each of the plurality of bandpass filters in the first direction is larger than a width of each of the plurality of bandpass filters in the second direction.

2. The spectroscopic module according to claim 1,
wherein the light detector includes a semiconductor substrate formed with the plurality of light receiving regions,
each of the plurality of light receiving regions is configured to detect light incident from each of the plurality of bandpass filters along the second direction, and
when seen in the second direction, both ends of each of the plurality of light receiving regions in the first direction are located inside both ends of each of the plurality of light passage openings in the first direction.

3. The spectroscopic module according to claim 1,
wherein each of the plurality of beam splitters has a rectangular plate shape, and
when seen in a third direction intersecting both the first direction and the second direction, a width of each of the plurality of beam splitters in a direction perpendicular to a thickness direction of each of the plurality of beam splitters is larger than a width of each of the plurality of bandpass filters in the first direction.

4. The spectroscopic module according to claim 1,
wherein each of the plurality of bandpass filters has a rectangular plate shape in which the first direction is a long-side direction and the second direction is a thickness direction.

5. A spectroscopic module comprising:
a plurality of beam splitters that are arranged along a first direction;
a plurality of bandpass filters that are disposed on one side in a second direction intersecting the first direction with respect to the plurality of beam splitters, each of the plurality of bandpass filters facing each of the plurality of beam splitters;
a light detector that is disposed on the one side in the second direction with respect to the plurality of bandpass filters and includes a plurality of light receiving regions, each of the plurality of light receiving regions facing each of the plurality of bandpass filters;
a support body that supports the plurality of beam splitters and the plurality of bandpass filters;
a light shielding portion that is disposed between the plurality of bandpass filters and the light detector, the light shielding portion having a plurality of light passage openings formed therein; and
a housing that accommodates the plurality of beam splitters, the plurality of bandpass filters, and the support body,
wherein each of a plurality of optical paths from the plurality of bandpass filters to the plurality of light receiving regions passes through each of the plurality of light passage openings,
a surface of each of the plurality of bandpass filters on a light detector side includes a first region corresponding to each of the plurality of light passage openings, and a second region located on both sides in the first direction with respect to the first region,
the second region is in contact with the light shielding portion, and
when seen in the first direction, a part of the housing is located on one side in a third direction with respect to the light detector, the third direction intersecting both the first direction and the second direction.

* * * * *